United States Patent [19]

Hong

[11] Patent Number: 5,570,134
[45] Date of Patent: Oct. 29, 1996

[54] MULTILINGUAL DISPLAY DEVICE AND METHOD THEREOF

[75] Inventor: Young-pyo Hong, Suwon, Rep. of Korea

[73] Assignee: Samsung Electronics Co., Ltd., Kyungki-Do, Rep. of Korea

[21] Appl. No.: 471,686

[22] Filed: Jun. 6, 1995

[30] Foreign Application Priority Data

Jul. 26, 1994 [KR] Rep. of Korea .................. 94-18035

[51] Int. Cl.⁶ .................................................. H04N 5/76
[52] U.S. Cl. .................. 348/467; 348/461; 348/462; 348/554; 348/558; 348/563
[58] Field of Search ............................ 348/467, 468, 348/461, 462, 482, 484, 554, 555, 558, 563, 564, 738; H04N 5/76

[56] References Cited

U.S. PATENT DOCUMENTS

| | | | |
|---|---|---|---|
| 4,523,236 | 7/1985 | Hayashi | 358/341 |
| 4,698,677 | 10/1987 | Kinghorn | 348/468 |
| 5,289,288 | 2/1994 | Silverman | 358/335 |
| 5,519,443 | 5/1996 | Salomon et al. | 348/467 |

*Primary Examiner*—John K. Peng
*Assistant Examiner*—Glenton B. Burgess
*Attorney, Agent, or Firm*—Sughrue, Mion, Zinn, Macpeak & Seas

[57] ABSTRACT

A multilingual display device is provided with a plurality of video signal processors for processing a video signal according to a broadcasting system, and a plurality of sound multiplex processors for processing an audio signal according to a sound multiplex mode. A microcomputer automatically generates OSD signals in a language of a broadcast receiving area by means of broadcasting system information and sound multiplex mode information provided from the plurality of video signal processors and the plurality of sound multiplex processors, thereby providing the advantage of interchangeability with respect to output of OSD signals in a television. This can be used in a television having an OSD function.

18 Claims, 2 Drawing Sheets

5,570,134

MULTILINGUAL DISPLAY DEVICE AND METHOD THEREOF

BACKGROUND OF THE INVENTION

The present invention relates to a multilingual display device and a method thereof and, in particular, to a multilingual display device and a method thereof in which characters are displayed using an on-screen display function in a particular language of an area corresponding to the broadcasting system and the sound multiplex mode after identifying the broadcasting system and the sound multiplex mode of a current received broadcast signal.

Recently, along with the development of electronic technology, the number of functions provided to a television has increased. For example, there are an on-screen display (to be called 'OSD' hereinafter) function and a sound multiplex function.

An OSD function is one which displays particular graphic symbols together with character signals on a screen so that a user is easily aware of information such as a control state and a reservation of a television.

A sound multiplex function is one which outputs a plurality of languages through speakers in a single television. The specific modes of the multiplex function include a 'main+main,' a 'main+sub,' and a 'sub+sub' mode. 'Main' indicates the main language of a corresponding country, and 'sub' indicates a particular language other than the main language of the country.

Accordingly, in the 'main+main' mode, a main language is output from the left and right speakers of a television. In the 'main+sub' mode, a main language and a secondary language are output separately from the left and right speakers of a television at the same time. In a 'sub+sub' mode, a secondary language is output from the left and the right speakers of a television.

FIG. 1 is a block diagram showing a conventional video apparatus which provides the sound multiplex function and the OSD function described above.

In FIG. 1 broadcast signals received through an antenna 2 are input to a tuner 4. Tuner 4 converts an input signal into an intermediate frequency (to be called IF, hereinafter) signal and applies the IF signal to an IF signal processor 6. IF signal processor 6 amplifies and processes the IF signal according to a control signal C2 provided from a microcomputer 8, and outputs the processed IF signal to a sound multiplex processor 10 and a video signal processor 12.

Video signal processor 12 detects a video signal from the processed IF signal, separates color difference signals from the detected video signal, and displays the color difference signals on an image receiving tube 14 as a composite video signal. That is, if the OSD signals (character type/color/size) generated from microcomputer 8 by user operation are input to video signal processor 12, video signal processor 12 mixes the OSD signals with the separated color difference signals and displays the mixed signal on image receiving tube 14 as a composite video signal.

Sound multiplex processor 10 outputs an audio signal in one of the 'main+main,' 'main+sub,' and 'sub+sub' modes according to a control signal C1 provided from microcomputer 8.

There are different modes for processing the sound multiplex signal. For example, a Zenith mode is employed in the U.S.A., a two carrier mode having two carrier signals during a transmission is adopted in Korea, and an FM—FM mode having one carrier signal which is frequency-modulated is adopted in Japan. Sound multiplex processor 10 is made to perform only one of these sound multiplex processing modes.

In the Zenith mode of the U.S.A., an amplitude-modulated pilot signal of 1 $f_H$ ($f_H$ is a horizontal sync frequency having a frequency of 15.734 KHz) is loaded on a sound carrier frequency of 4.5 MHz as an identifying signal for identifying a stereo broadcast mode or bilingual broadcast mode. In the two carrier mode of Korea, an amplitude-modulated pilot signal of 3.5 $f_H$ (55.07 MHz) is loaded on a sound carrier frequency of 4.72 MHz of the second sound channel (L-R). In the FM—FM mode of Japan, a pilot signal frequency-modulated from 3.5 $f_H$ (55.07 KHz) to 922.5 Hz (multiplex broadcast) or 982.5 Hz (stereo broadcast) is loaded on a sound carrier frequency of 4.5 MHz.

The sound multiplex processor of the U.S.A. is disclosed in U.S. Pat. No. 4,953,021 and the sound multiplex processor of Japan is disclosed in U.S. Pat. No. 4,703,501.

The above-described conventional video apparatus shown in FIG. 1 can perform only a particular broadcasting system and the sound multiplex mode of a particular country. Therefore, it cannot receive all the broadcast signals corresponding to broadcasting systems and sound multiplex modes, and can display only the characters of a particular country using an OSD function, thereby lowering interchangeability.

SUMMARY OF THE INVENTION

It is an object of the present invention to provide a multilingual display device which automatically displays a particular language suitable for a broadcast receiving area using an OSD by identifying the broadcasting system and the sound multiplex mode of a broadcast signal received.

It is another object of the present invention to provide a method for displaying a particular language suitable for a broadcast receiving area using an OSD by identifying a broadcasting system via the vertical synchronizing signal and the color subcarrier of a received broadcast signal, and identifying a sound multiplex mode via an identifying signal for identifying a stereo signal or bilingual signal.

To achieve the above objects, there is provided a multilingual display device, according to the present invention, comprising: tuning means for converting a received broadcast signal into an IF signal and outputting the IF signal; a plurality of sound multiplex processors for detecting an audio signal from the IF signal, processing the audio signal according to a sound multiplex mode, and outputting information upon the sound multiplex mode; a plurality of video signal processors for detecting a video signal from the IF signal, processing the video signal according to a broadcasting system, outputting information upon the broadcasting system, mixing input OSD signals with the processed video signal, and outputting the mixed signal for display; and control means for outputting control signals for selecting respective corresponding processors among the plurality of sound multiplex processors and the plurality of video signal processors, on the basis of the sound multiplex mode information and the broadcasting system information, and outputting the OSD signals corresponding to a particular language of a corresponding area to the video signal processor selected by one of the control signals.

There is provided a multilingual display method, according to the present invention, in a multi-broadcast signal processing method for converting a received multi-broadcast signal into an IF signal according to the broadcasting system, outputting the IF signal, and processing the IF signal respectively into a video signal and an audio signal, the multilingual display method comprising the steps of:

firstly identifying the broadcasting system via the vertical sync signal frequency and the color subcarrier of the video signal;

secondly identifying a sound multiplex mode via a pilot signal as an identifying signal for identifying whether the audio signal is of a stereo broadcast or of a multilingual broadcast; and producing OSD signals in more than at least one language being used in a corresponding area, on the basis of the results of the first and second identifying steps.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

A preferred embodiment of a multilingual display device and a method thereof according to the present invention will be explained in more detail, referring to the attached drawings.

Figure 1:
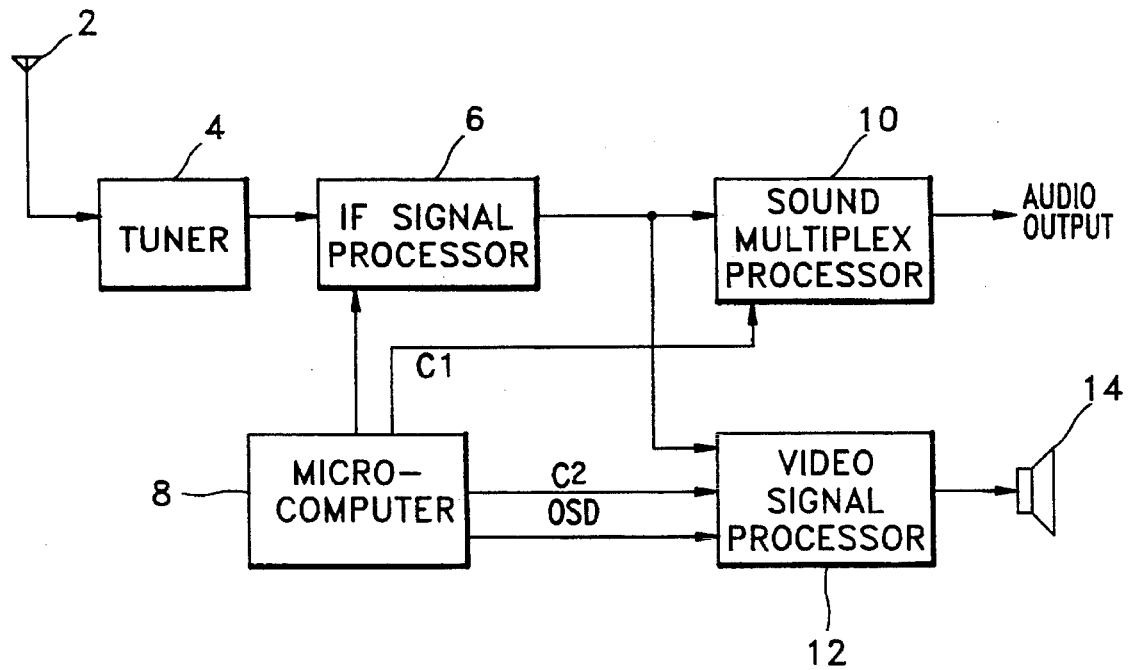
FIG. 1 is a block diagram showing a conventional video apparatus.
Figure 2:
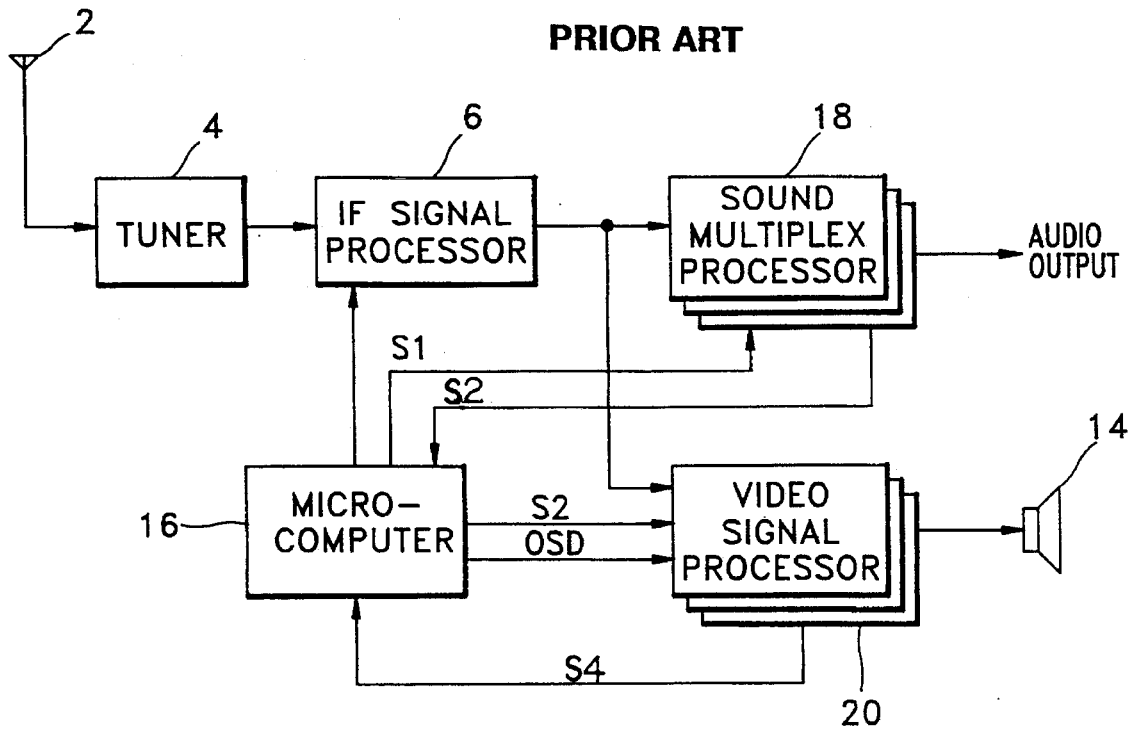
FIG. 2 is a block diagram of an embodiment of a multilingual display device according to the present invention.

FIG. 2 is a block diagram of an embodiment of a multilingual display device according to the present invention. Like elements will be labelled with the same reference numerals as in FIG. 1.

Referring to FIG. 2, the multilingual display device comprises a tuner 4 for tuning aerially transmitted signals through an antenna 2 into an IF signal of predetermined channel signal, an IF signal processor 6 for amplifying and wave-shaping the IF signal output from tuner 4, a microcomputer 16 for outputting control signals S1 and S2 for controlling the operation of each component and OSD signal S, a sound multiplex processing portion 18 for detecting an audio signal from the IF signal, processing the detected audio signal according to a sound multiplex mode, and outputting information upon the sound multiplex mode to microcomputer 16, a video signal processing portion 20 for detecting a video signal from the IF signal, processing the detected video signal according to a broadcasting system, and outputting information upon the broadcasting system to microcomputer 16, and an image receiving tube 14 for displaying a signal provided from video signal processing portion 20.

Sound multiplex processing portion 18 includes a plurality of sound multiplex processors for processing audio signals according to sound multiplex modes, and video signal processing portion 20 includes a plurality of video signal processors which process video signals according to broadcasting systems.

By constituting the multilingual display device in this way, it has interchangeability with respect to all the broadcasting systems and provides all the languages used in the world in the sound multiplex mode.

Language areas will be classified according to broadcasting systems and sound multiplex modes. The main languages of areas adopting PAL-N and PAL-M broadcasting systems are generally English, Spanish and Portuguese. The main languages of areas adopting an NTSC broadcasting system and a Zenith sound multiplex mode are usually English, French and Spanish. In Korea, an NTSC broadcasting system and a two carrier sound multiplex mode are adopted, and in Japan, an NTSC broadcasting system and an FM—FM sound multiplex mode are adopted. Languages used can be determined by these differences of television signals in the broadcasting systems and in the sound multiplex modes according to areas.

Therefore, it is desirable that sound multiplex processing portion 18 is provided with a plurality of sound multiplex processors so as to provide languages according to an area in the sound multiplex mode, and video signal processing portion 20 is provided with a plurality of video signal processors so as to permit signal processing according to the broadcasting systems of areas.

The operation of the device shown in FIG. 2 will be described as follows.

In FIG. 2, an audio signal is detected from an IF signal which is output from IF signal processor 6, and is processed in sound multiplex processing portion 18. During the processing of the audio signal, information upon a sound multiplex mode (a pilot signal) is provided to microcomputer 16. Then, microcomputer 16 outputs control signal S1 corresponding to the input sound multiplex mode information to sound multiplex processing portion 18 for controlling a sound multiplex processor corresponding to the current sound multiplex mode among the plurality of sound multiplex processors to operate.

A video signal is detected from the IF signal output from IF signal processor 6, is processed in video signal processing portion 20, and is output to image receiving tube 14. During the processing of the video signal, information such as a vertical sync signal and a color subcarrier upon a broadcasting system is provided to microcomputer 16. Then, microcomputer 16 outputs control signal S2 corresponding to the broadcasting system information to video signal processing portion 20 for controlling a video signal processor corresponding to the current broadcasting system among the plurality of video signal processors to operate.

Meanwhile, since languages used are different according to broadcast areas, microcomputer 16 generates OSD signals corresponding to a particular language via the current sound multiplex mode information and the broadcasting system information input from sound multiplex processing portion 18 and video signal processing portion 20, and outputs the OSD signals to video signal processing portion 20.

The OSD signals output from microcomputer 16 are mixed with the processed video signal in video signal processing portion 20 and the mixed signal is displayed on image receiving tube 14.

Video signal processing portion 20 is provided with a plurality of deflectors (not shown) for controlling the deflection of the signals displayed by means of control signals provided from microcomputer 16, via a well-known technology. An OSD portion for generating characters under the control of microcomputer 16 can be provided apart from microcomputer 16.

The operation of microcomputer 16 for generating OSD characters of a particular language by means of the information output from sound multiplex processing portion 18 and video signal processing portion 20 will be described in detail with reference to FIG. 3.

Figure 3:
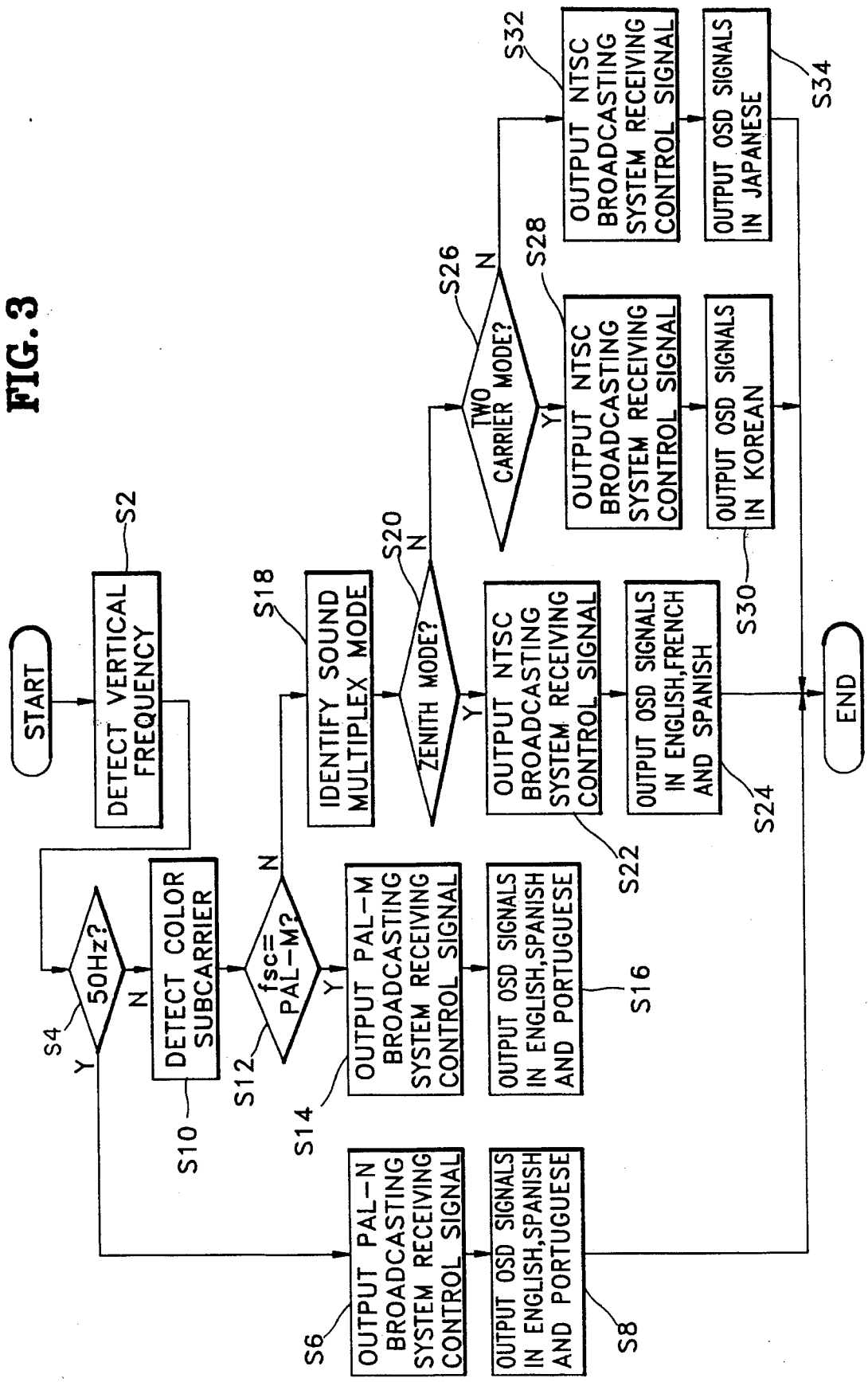
FIG. 3 is a flowchart of an embodiment of a multilingual display method according to the present invention.

In FIG. 3, microcomputer 16 detects the frequency of a vertical sync signal (to be called 'vertical frequency' hereinafter) from information upon a broadcasting system provided from video signal processing portion 20 in step S2.

In step S4, it is determined whether the vertical frequency detected in step S2 is 50 Hz, and if it is, a PAL-N broadcasting system receiving control signal is output to video signal processing portion 20 in step S6. In step S8, OSD signals are output in English, Spanish and Portuguese.

Here, according to the intention of a designer, the program can be modified to output only one of English, Spanish and Portuguese as OSD signals, or to output the three languages in turn at a predetermined time interval.

If it is determined that the vertical frequency is not 50 Hz in step S4, microcomputer 16 detects a color subcarrier (generally to be called $f_{sc}$) in step S10. In step S12, it is determined whether the color subcarrier detected in step S10 is a PAL-M broadcasting system color subcarrier, and if it is, a PAL-M broadcasting system receiving control signal is output to video signal processing portion 20 in step S14. In step S16, OSD signals are output in English, Spanish and Portuguese. Here, in step S12, the PAL-M broadcasting system color subcarrier has a frequency of 3.575611 MHz and an NTSC broadcasting system color subcarrier has a frequency of 3.579545 MHz.

In step S12, if the color subcarrier is not that of a PAL-M broadcasting system, it is determined to be that of an NTSC broadcasting system. In step S18, the current sound multiplex processing mode is identified by means of information upon a sound multiplex mode output from sound multiplex processing portion 18. In step S20, it is determined whether the sound multiplex mode is a Zenith mode, and if it is, an NTSC broadcasting system control signal is output to video signal processing portion 20 in step S22. In step S24, OSD signals are output in English, Spanish and Portuguese. In step S20, if an amplitude-modulated pilot signal loaded on sound carrier of 4.5 MHz, having the same frequency as that of a horizontal sync signal (generally to be called, $f_H$) is detected, the sound multiplex mode is determined to be a Zenith mode.

If the sound multiplex mode is not a Zenith mode in step S20, it is determined whether the multiplex mode is a two carrier mode in step S26. If it is, an NTSC broadcasting system receiving control signal is output to video signal processing portion 20 in step S28. In step S30, OSD signals are output in Korean. Here, in step S26, if an amplitude-modulated pilot signal of 3.5 $f_H$ loaded on the second sound carrier of 4.72 MHz is detected, the sound multiplex mode is the two carrier mode of Korea. If a frequency-modulated pilot signal of 3.5 fH loaded on the sound carrier of 4.5 MHz is detected, the multiplex mode is the FM—FM mode of Japan.

If the sound multiplex mode is an FM—FM mode, not a two carrier mode in step S26, an NTSC broadcasting system receiving control signal is output to video signal processing portion 20 in step S32. In step S34, OSD signals are output in Japanese.

Accordingly, if a television constituted as shown in FIG. 2, and operating as shown in FIG. 3 is used in Korea, since signals are received in an NTSC broadcasting system and in a two carrier sound multiplex mode, a microcomputer identifies them and outputs OSD signals in Korean. If the television is used in the U.S., since signals are received in an NTSC broadcasting system and in a Zenith sound multiplex mode, a microcomputer outputs OSD signals in English, French and Spanish according to the manipulation of a designer.

As described above, the present invention determines a broadcasting system and a sound multiplex mode, selects a particular language (the main language) corresponding to a broadcast receiving area, and automatically displays OSD signals corresponding to the selected language, thereby providing the advantages of interchangeability and convenience to users.

What is claimed is:

1. A multilingual display device comprising:

tuning means for converting a broadcast signal into an IF signal and outputting said IF signal;

a plurality of sound multiplex processors for detecting an audio signal from said IF signal, processing said audio signal according to a sound multiplex mode, and outputting information regarding the sound multiplex mode;

a plurality of video signal processors for detecting a video signal from said IF signal, processing said video signal according to a broadcasting system, outputting information regarding the broadcasting system, mixing input OSD signals with said processed video signal, and outputting said mixed signal for display; and control means for outputting control signals for selecting respective corresponding processors among said plurality of sound multiplex processors and said plurality of video signal processors, said selection based upon said sound multiplex mode information and said broadcasting system information, said control means outputting said OSD signals corresponding to a particular language of a given area to said video signal processor selected by one of said control signals.

2. A multilingual display device according to claim 1, wherein said plurality of sound multiplex processors output a pilot signal, said pilot signal serving as an identification signal for distinguishing between a stereo broadcast or a multilingual broadcast.

3. A multilingual display device according to claim 1, wherein said plurality of video signal processors output a vertical sync signal and a color subcarrier as information regarding the broadcasting system of the current received broadcast signal.

4. A multilingual display method for use in a multi-broadcast signal processing system for converting a received multi-broadcast signal into an IF signal according to a broadcasting system and processing the IF signal respectively into a video signal and an audio signal, said multilingual display method comprising the steps of:

firstly identifying said broadcasting system via a vertical frequency and a color subcarrier of said video signal;

secondly identifying a sound multiplex mode via a pilot signal for determining whether said audio signal is of a stereo broadcast or of a multilingual broadcast; and producing OSD signals in at least one language used in a corresponding area selected from a plurality of languages on the basis of the results of said first and second identifying steps.

5. A multilingual display method according to claim 4, wherein said first identifying step further comprises:

outputting broadcasting system information for determining said broadcasting system to be a PAL-N broadcasting system, if said vertical sync signal frequency of said video signal is a predetermined first frequency;

outputting broadcasting system information for determining said broadcasting system to be a PAL-M broadcasting system, if said vertical frequency and said color subcarrier of said video signal are respectively a predetermined second frequency and a predetermined third frequency; and outputting broadcasting system information for determining said broadcasting system to be an NTSC broadcasting system, if said vertical frequency and said color subcarrier of said video signal are respectively a predetermined second frequency and a predetermined fourth frequency.

6. A multilingual display method according to claim 4, wherein said second identifying step further comprises:

outputting sound multiplex mode information for determining said sound multiplex mode to be the multiplex mode of the United States if said pilot signal is amplitude-modulated and has the same frequency as that of a horizontal frequency on a sound carrier of a predetermined fifth frequency;

outputting sound multiplex mode information for determining said sound multiplex mode to be the multiplex mode of Japan if said pilot signal is frequency-modulated and has a frequency a predetermined number of times as high as the horizontal frequency on a sound carrier of a predetermined fifth frequency; and outputting sound multiplex mode information for determining said sound multiplex mode to be the multiplex mode of Korea, if said pilot signal is amplitude-modulated and has a frequency a predetermined number of times as high as the horizontal frequency on a sound carrier of a predetermined sixth frequency.

7. A multilingual display method according to claim 4, wherein said OSD display step further comprises:

displaying a plurality of languages if an area corresponding to said broadcasting system and said sound multiplex mode uses more than one language.

8. A multilingual display method according to claim 4, wherein said OSD display step further comprises:

automatically displaying a language selected among a plurality of languages if an area corresponding to said broadcasting system and said sound multiplex mode uses more than one language.

9. A multilingual display method for use in a multi-broadcast signal processing system for converting a received multi-broadcast signal into an IF signal according to a broadcasting system and processing the IF signal respectively into a video signal and an audio signal, said multilingual display method comprising the steps of:

(a) detecting a vertical ferquency;

(b) transmitting a PAL-N broadcasing control signal if said vertical frequency equals a predetermined value;

(c) determining a color subcarrier frequency associated with said video signal where said vertical frequency does not equal said predetermined value.

10. A multilingual display method according to claim 9, wherein said (b) further comprises:

providing an on-screen-display in the languages associated therewith.

11. A multilingual display method according to claim 9, wherein said (c) further comprises:

(d) transmitting a PAL-M broadcasting control signal if said color subcarrier frequency equals a predetermined value;

(e) identifying a sound multiplex mode if said color subcarrier frequency does not equal said predetermined value.

12. A multilingual display method according to claim 11, wherein said (d) further comprises:

providing an on-screen-display in the languages associated therewith.

13. A multilingual display method according to claim 11, wherein said (e) further comprises:

(f) transmitting an NTSC broadcasting control signal if said sound multiplex mode is determined to be a Zenith mode;

(g) determining whether said sound multiplex mode is a two carrier mode if said sound multiplex mode is determined to not be a Zenith mode.

14. A multilingual display method according to claim 13, wherein said (f) further comprises:

providing an on-screen-display in the languages associated therewith.

15. A multilingual display method according to claim 13, wherein said (g) further comprises:

(h) transmitting an NTSC broadcasting control signal associated with the two carrier mode of Korea if said sound multiplex mode is determined to be a two carrier mode, (i) otherwise transmitting an NTSC broadcasting control signal associated with an FM—FM mode of Japan.

16. A multilingual display method according to claim 15, wherein said (h) further comprises:

providing an on-screen-display in the language associated therewith.

17. A multilingual display method according to claim 15, wherein said (i) further comprises:

providing an on-screen-display in the language associated therewith.

18. A multilingual display device as set forth in claim 1, wherein the sound multiplex mode is one of a Zenith mode, a two carrier mode and an FM—FM mode.

* * * * *